Nov. 19, 1946.  A. R. HOLOWENKO  2,411,373
TORSIONAL VIBRATION ABSORBER
Filed March 9, 1944
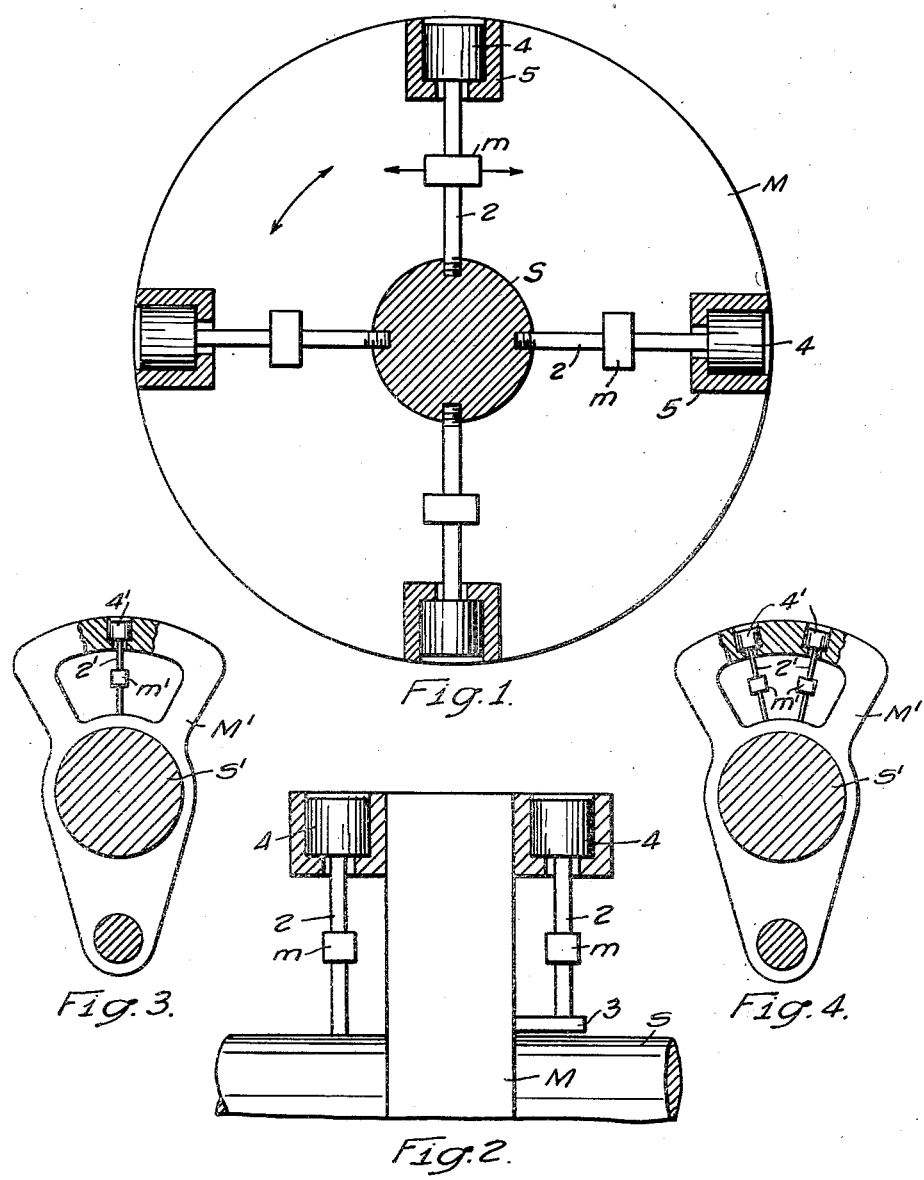
WITNESSES:
E. A. McCloskey
E. F. Oberheim
INVENTOR
Alfred R. Holowenko.
BY
Paul E. Friedemann
ATTORNEY Patented Nov. 19, 1946

2,411,373

UNITED STATES PATENT OFFICE 2,411,373

TORSIONAL VIBRATION ABSORBER

Alfred R. Holowenko, Pittsburgh, Pa., assignor to Westinghouse Electric Corporation, East Pittsburgh, Pa., a corporation of Pennsylvania Application March 9, 1944, Serial No. 525,792

7 Claims. (Cl. 74—574)

This invention relates to vibration absorbing devices, and more particularly to devices for absorbing torsional vibrations.

This invention has particular utility in minimizing torsional vibrations in the crank shafts of reciprocating engines or the like, and also in the shaft systems to which such engines are connected.

Vibrations, in general, are caused by an outside force acting on a body which produces an elastic deflection of the body within elastic limits. This elastic deflection of the body produces internal restoring forces which act as soon as the outside force ceases to act, to return the body to its original condition of force equilibrium. However, in view of the mass of the body the condition of force equilibrium is passed through and restoring forces in the opposite direction are created. These pendulum-like movements through the position of the body for force equilibrium continue until the energy of the outside or applied force is completely damped by the internal friction of the body.

In the case of torsional vibrations, the outside force is the force couple which twists or causes an elastic deflection of the shaft in torsion. When the force couple ceases to act, the internal stresses restoring the shaft to its original position of force equlibrium twist the shaft in the opposite direction beyond the position of force equilibrium and thus set up torsional vibrations about the shaft center line. Torsional vibrations are created in crankshafts of engines of the reciprocating type because of the periodic impulses to which they are subjected. The same conditions obtain in straight shafts when either coupled to such crankshafts or otherwise subjected to periodic torque impulses.

The natural frequency of the torsional vibration of a shaft depends upon its dimensions, the characteristics of the material from which it is made and the size and arrangement of the masses which are attached to it. When the frequency of the applied impulses is in a certain relationship to the natural frequency of the shaft, a condition of resonance exists, and if under this condition the periodically applied impulses occur frequently, the amplitude of the vibration may be considerable. Should the resulting torsional stresses exceed the endurance limit of the material from which the shaft is made, the shaft will fail by progressive fracture.

Vibration absorbers have been built for linear motion. The theoretical aspects of linear vibration absorbers are analogous to those embodied in the torsional vibration absorber to be hereinafter disclosed, the fundamental idea being to provide a resiliently mounted mass associated with the main mass, the vibrations of which are to be absorbed, which has a natural vibrating frequency such that it produces an alternating force which is 180° out of phase with the applied alternating force. By properly proportioning the size of the resiliently mounted mass, it is possible to produce opposing forces of such a magnitude that the main mass may not vibrate at all. In rotation if an alternating torque resulting from periodic torque impulses is applied to a shaft or flywheel having a certain mass, it is possible to select a vibration absorbing system having a natural frequency which is equal to that of the applied torque impulses thereby absorbing or preventing vibrations of the flywheel or shaft.

It should also be noted that, for example, in the case of a flywheel directly driven by a reciprocating engine, increasing flywheel speeds are obtained only by increasing the frequency of the applied torque impulses. Thus in order to absorb the torsional vibrations of flywheels or shafts for all the operating speeds of the system, it is necessary to provide a vibration absorber in which the natural frequency may be changed to correspond to the changing conditions.

A principal object of this invention is to provide a torsional vibration absorber which is simple in construction and positive in operation.

Another and equally important object of this invention is to provide a torsional vibration absorber in which the natural frequency of vibration may be adjusted automatically to correspond to the vibrations of the power transmitting system of which it forms a part.

A specific object of this invention is to provide a torsional vibration absorber for rotating members subjected to torsional vibrations which comprises a minimum of parts.

Another specific object of the invention is to provide a torsional vibration absorber which may be easily applied to rotating members.

Other objects and advantages will become more apparent upon a study of the following specification when considered in conjunction with the accompanying drawing, in which:

Figure 1 illustrates torsional vibration absorbers embodying the principles of this invention, attached to a flywheel, Fig. 2 is a side view of the assembly of Fig. 1, illustrating two methods of mounting the torsional vibration absorbers, Fig. 3 illustrates the torsional vibration absorber as applied to a crankshaft.

Fig. 4 illustrates a crankshaft application in which more than one torsional vibration absorber is employed, and Fig. 5 is a schematic illustration of the fundamental theory of this invention.

In Fig. 5, there is illustrated a pair of stationary supports 1 between which is connected a wire or rod 2 which is placed under a predetermined tension. A mass m is secured centrally of the wire or rod 2. If now a force is applied to the mass m, displacing it, for example, to its lower dotted position, and then suddenly removed, the mass will vibrate from one dotted position to the other with a gradually decreasing amplitude of movement, which decrease in amplitude is caused mainly by the absorption of the energy of the vibration by the internal friction of the wire and by air resistance. The damping effect of the internal rod or wire friction and air resistance results only in a change in the amplitude of the vibratory movement and does not affect the natural frequency of the vibrating system.

It can be shown that the natural frequency of a mass at the center of a wire under tension is:

$$\omega_n = \sqrt{\frac{4T}{mL}}$$

where T is the wire tension, m is the mass at the center of the wire and L is the length of the wire. To vary the natural frequency, it will be noted that any one of the mass, the wire length or wire tension may be changed. In practice, however, the mass and wire length for a particular vibrating system are usually fixed quantities and the natural frequency of the system is most conveniently changed by slightly moving one of the supports 1 relative to the other to change the wire tension. This invention makes use of this principle for changing the natural frequency of the torsional vibration absorbing system.

The various figures of the drawing illustrate the application of this invention to a flywheel and to an engine crankshaft. It is to be understood, however, that this invention is applicable in any system wherein torsional vibrations are to be absorbed. The system is further susceptible of numerous modifications, all of which involve the fundamental principles of this invention and are, therefore, believed to clearly fall within the scope of the teachings of this invention.

Referring now to Figs. 1 and 2, there is illustrated a shaft S to which there is secured a flywheel mass M. Each of the torsional vibration absorbers comprises a radially disposed rod or wire 2 substantially centrally of which is secured a mass m. The inner end of the rods or wires 2 are rigidly secured with respect to the flywheel mass M. This may be accomplished in any suitable manner, for example, as in Fig. 1 by drilling and tapping the shaft to receive the threaded end of the rod, or by providing a lug 3 (Fig. 2) which projects from the flywheel face at a point adjacent the shaft to receive the threaded rod end. The outer extremity of the rod 2 has secured thereto a mass 4 which is radially slidable within a sleeve 5 rigidly secured to the face of the flywheel mass M. It may now be seen that the vibration system illustrated in Figs. 1 and 2 is the same as that of Fig. 5. The shaft supporting one end of the rod or wire 2 corresponds to one of the supports 1, the weight or mass 4 slidably mounted in the sleeve 5 corresponding to the other support 1. This construction, therefore, provides a vibration system wherein the mass m may vibrate in the manner illustrated by the arrow. That is, the vibratory movement of the mass is substantially tangential to its path of movement about the shaft axis when the flywheel rotates. Thus assuming a predetermined constant frequency of torque impulses applied to the shaft S, an alternating torque acting on the flywheel M will be created. Assuming also that the rod or wire tension and the mass are in such proportion that the natural frequency of this vibrating system is equal to that of the applied torque impulses, it is apparent that the mass m will vibrate in opposition to the alternating torque of the flywheel and if the mass m is in proper proportion to the flywheel mass M, the torsional vibrations of the flywheel mass are reduced substantially to zero.

All of the foregoing assumes constant conditions of the frequency of the applied torque impulses and the tension of the rod or wire 2. Now the other feature of this invention which provides an automatic adjustment of the natural frequency of vibration of the mass m resides in the provision of the radially slidable mass 4. It will be recalled from the hereinbefore made discussion in connection with Fig. 5, that the natural frequency, $$\omega_n = \sqrt{\frac{4T}{mL}}$$

where T is the wire tension, m the mass and L the wire length. It was further noted in this discussion that the natural frequency of the mass m could be most conveniently changed by adjusting the wire tension. Since the mass 4 is radially movable, the varying centrifugal forces acting on the mass with varying speeds vary the wire tension in like amount and hence varies the natural frequency $\omega_n$ of the vibrating system directly as the speed. This is evident from the equation for the natural frequency $\omega_n$. In view of the fact that the dimensions of the vibrating system are fixed, that is, m and L are constant, the equation may be written $$\omega_n = K_1\sqrt{T} = K_2S$$

where $K_1$ and $K_2$ are constants involving mass and length of the wire and S the speed of rotation of the flywheel mass M.

With a knowledge of the frequency of the applied torque, it is possible to obtain a ratio of the mass m to the mass 4 which will give the proper natural frequency of the mass m on the center of the wire. The maximum applied torque must be known to determine the size or weight of the mass m. Vibrations of the mass m produce forces tangential to its path of motion about the shaft axis which act as a distance r (the radial distance of the mass) from the axis of rotation. Consequently torques about the axis of rotation are produced which in accordance with the hereinbefore mentioned theories are 180° out of phase with the applied torque. The mass m vibrates with harmonic motion. If this motion is termed $x = x_0 \sin \omega t$, where $x_0$ is the maximum displacement of mass $m$, the maximum force tangentially at the radius $r$ is the product of the mass and the acceleration divided by 2 or $$\frac{(m)(x_0\omega^2)}{2}$$

The maximum torque then becomes $$T_0 = \frac{(m)(x_0\omega^2)}{2} \cdot r$$

$$T_0 = \frac{mx_0\omega^2 r}{2}$$

and $$m = \frac{2T_0}{x_0\omega^2 r}$$

Since the weight of mass $m$ is now known, it is possible to obtain the proper weight of the mass 4 necessary to produce the required natural frequency of the mass $m$ for a given frequency of applied torque.

The function of the vibration absorbers illustrated in Figs. 3 and 4 wherein similar parts have been given primed reference characters is analogous to that of the devices of Figs. 1 and 2. These figures have been presented primarily to demonstrate practical applications of the devices of this invention to other types of rotating members. There are, of course, many other applications. It will also be apparent from Figs. 3 and 4 that it may not always be possible to provide a vibrating system having a mass $m$ of sufficient size to exert an opposed torque equal to the maximum applied torque; it is, however, in most cases possible to reduce the torsional vibrations to safe low values. More than one mass or a distributed mass may be used on each rod or wire if desired. The theory of operation would not be changed with such arrangements.

The foregoing disclosure and the showings made in the drawing are merely illustrative of the principles of this invention and are not to be considered in a limiting sense. The only limitations are to be determined from the scope of the appended claims.

I claim as my invention:

1. A device for absorbing the torsional vibrations of a member rotating about an axis comprising, in combination, a strip-like element radially disposed of said mass, the extremity of said element near the axis of said member being rigidly secured with respect to said member, a mass secured to the other extremity of said element, said mass being disposed for radial movement only of the member, and a second mass secured substantially centrally of the strip-like member.

2. A device for absorbing the torsional vibrations of a member rotating about an axis comprising, in combination, a mass, means for mounting the mass to rotate with the member at a predetermined radial distance from the axis and resiliently supporting the mass to allow vibratory movement thereof with respect to said member and means including a second mass secured to said means for mounting the first mentioned mass and having freedom of movement only in a direction to vary the tensile loading of the means for mounting the first mentioned mass in dependance of the speed of rotation of said member.

3. A device for absorbing the torsional vibrations of a rotating member comprising, in combination, a plurality of radially disposed rods, means for rigidly securing the inner end of each of said rods with respect to said member, a mass secured to the outer end of each of said rods, means for supporting each of said masses to rotate with said member and allow movement of said masses radially of the member, and a second mass secured substantially centrally of each of said rods.

4. A device for absorbing the torsional vibrations of a member rotating about an axis comprising, in combination, a rod radially disposed of said member, means for rigidly securing the inner end of said rod with respect to said member, a mass secured to the outer end of said rod, a sleeve secured to said member for guiding said mass for radial movement only of said member, and a second mass secured substantially centrally of said rod.

5. A device for absorbing the torsional vibrations of a member rotating about an axis comprising, in combination, a resilient strip-like element, means securing said resilient strip-like element at the extremities thereof, to said rotating member in a position radially of said member, and a mass secured substantially centrally of said resilient strip-like element.

6. A device for absorbing the torsional vibrations of a member rotating about an axis, comprising, in combination, a rod, a mass secured substantially centrally of said rod, and means for supporting said rod, adjacent the extremities thereof, on said member to effect rotation of said rod and mass with said member and in a position on said member whereby said mass may exert a torque about the axis of rotation of said member in opposition to the torque applied to said member.

7. A device for absorbing the torsional vibrations of a member secured to a power transmitting shaft comprising, in combination, a rod, a mass secured substantially centrally of said rod, means supporting said rod, adjacent the extremities thereof, on said member to effect rotation of said rod and mass with said member and in a position on said member to position said mass a predetermined radial distance from the axis of rotation of said member, and means responsive to the speed of rotation of said member for varying the tensile loading of said rod.

ALFRED R. HOLOWENKO.